United States Patent [19]

Ueyama et al.

[11] Patent Number: 4,673,075

[45] Date of Patent: Jun. 16, 1987

[54] WORKING ARRANGEMENTS FOR PERFORMING MULTIPLE OPERATIONS WITH ROBOTS

[75] Inventors: Masato Ueyama, Higashihiroshima; Takeshi Kanamaru; Toshikazu Shirai, both of Hiroshima; Kiyoshi Nakano, Higashihiroshima, all of Japan

[73] Assignee: Mazda Motor Corporation, Japan

[21] Appl. No.: 799,596

[22] Filed: Nov. 19, 1985

[30] Foreign Application Priority Data

Nov. 22, 1984 [JP] Japan ................................ 59-247829

[51] Int. Cl.⁴ ....................... B23Q 15/22; B23Q 16/00
[52] U.S. Cl. .................................. 198/339.1; 29/564; 29/703; 29/791; 29/799; 29/824; 141/232; 901/6
[58] Field of Search .................... 198/339.1, 340, 341; 901/6-8, 1, 41-43; 29/822-824, 564, 711, 703, 791, 799; 141/99, 231, 232, 248, 250, 270; 137/234.6; 53/168; 408/13

[56] References Cited

U.S. PATENT DOCUMENTS

| | | | |
|---|---|---|---|
| 3,395,723 | 8/1968 | Tatsuno | 137/234.6 |
| 3,536,109 | 10/1970 | Ginsburgh et al. | 141/232 |
| 3,774,723 | 11/1973 | Johnston | 137/234.6 |
| 4,092,719 | 5/1978 | Salmon | 29/711 |
| 4,503,596 | 3/1985 | Ida et al. | 198/341 |

FOREIGN PATENT DOCUMENTS

51-43029  11/1976  Japan .
58-151972  9/1983  Japan .
58-148083  9/1983  Japan .

Primary Examiner—Jeffrey V. Nase
Attorney, Agent, or Firm—Gerald J. Ferguson, Jr.; Michael P. Hoffman; Ronni S. Malamud

[57] ABSTRACT

A working arrangement for performing multiple operations with a robot comprises a plurality of working stations at each of which a predetermined operation with a tool is performed to an unfinished work, a shifting unit provided in connection with each working station for holding the tool so as to be movable between a predetermined reference position and an operating position in each working station and for shifting the tool to the reference position from the operating position, and a robot provided to be movable in relation to the working stations for causing the tool to move from the reference position to the operating position in each working station.

11 Claims, 8 Drawing Figures

WORKING ARRANGEMENTS FOR PERFORMING MULTIPLE OPERATIONS WITH ROBOTS

BACKGROUND OF THE INVENTION

1. Field of the Invention

The present invention relates generally to working arrangements for performing multiple operations with robots, and more particularly, to a working arrangement for performing various operations with respective tools handled by a robot to each of unfinished works staying at plural working stations.

2. Description of the Prior Art

In connection with a working arrangement for performing various different operations with respective specific tools to each of unfinished works at a plurality of working stations, there has been proposed to use a robot for setting each of the tools to the corresponding unfinished work and then removing the tool from the unfinished work. In such a case, the robot is installed in the working station so as to be operative to hold a selected tool and set the same to an unfinished work when the unfinished work is transported into the working station by, for example, a conveyer, then to hold the tool again and remove the same from the unfinished work to be ready for next operation after the operation with that tool is completed.

In such a working arrangement utilizing the robot as mentioned above, for performing various operations with the respective tools each handled by the robot to the unfinished work at each of plural working stations located to be relatively distant from each other, it is required to install a robot at each of the working stations. This requirement results in a problem that the cost of facilities is extremely increased because each of the robots is considerably expensive, and further in a disadvantage that the duration of recess for each robot is prolonged in dependence of the substance of the operations with the tools and therefore the robots may not be used effectively.

OBJECTS AND SUMMARY OF THE INVENTION

Accordingly, it is an object of the present invention to provide a working arrangement for performing multiple operations with a robot, which avoids the foregoing problems encountered with the prior art.

Another object of the present invention is to provide a working arrangement for performing multiple operations with a robot, which is operative to perform various operations with respective tools handled by the robot to unfinished works at each of plural working stations, and in which a single robot is provided for the plural working stations so that the cost of facilities is effectively lowered.

A further object of the present invention is to provide a working arrangement for performing multiple operations with a robot, which is operative to perform various operations with respective tools handled by the robot to unfinished works at each of plural working stations, and in which the duration of recess for the robot is diminished so that the coefficient of utilization of the robot is improved.

According to an aspect of the present invention, there is provided a working arrangement for performing multiple operations with a robot comprising; a plurality of working stations at each of which a predetermined operation with a tool is performed to an unfinished work, a shifting unit provided in relation to each of the working stations for holding the tool so as to be movable between a predetermined reference position and an operating position in the working station and for shifting the tool to the predetermined reference position from the operating position, and a robot provided to be movable in relation to the working stations for causing the tool to move from the predetermined reference position to the operating position in each of the working stations.

In the working arrangement thus constituted in accordance with the present invention, a single robot which is only required basically to be capable of moving the tool from the predetermined reference position to the operating position in each of the working stations, may be provided for the plural working stations instead of a plurality of robots provided respectively for the plural working stations, and the shifting unit provided in each of the working stations is only required basically to function to hold the tool and return the same to predetermined reference position from the operating position. Accordingly, the cost of providing the robot is reduced by a large margin and the expenses of the facilities are effectively reduced comparing with the previously proposed working arrangement in which a plurality of expensive robots, each of which is required to perform complicated operations, are provided in a plurality of working stations, respectively.

Further, the single robot is capable of operating in each of the working stations in such a manner as, for example, to set the tool to the unfinished work at one of the working stations when the operations with the tool are performed at another of the working stations wherein the tool has been previously set to the unfinished work by the robot, and consequently the coefficient of utilization or the rate of operation of the robot is increased.

The above, and other objects, features and advantages of the present invention will become apparent from the following detailed description which is to be read in conjunction with the accompanying drawings.

DESCRIPTION OF THE PREFERRED EMBODIMENTS

Now, embodiments of working arrangement for performing multiple operations with a robot according to the present invention will be described in detail with reference to the accompanying drawings hereinafter.

Figure 1:
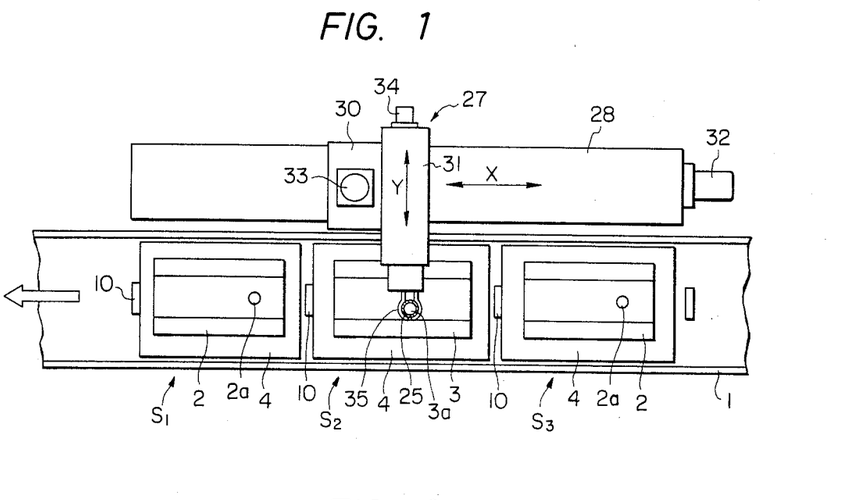
FIG. 1 is a schematic plane view showing partially an embodiment of working arrangement for performing multiple operations with a robot according to the present invention.
Figure 2:
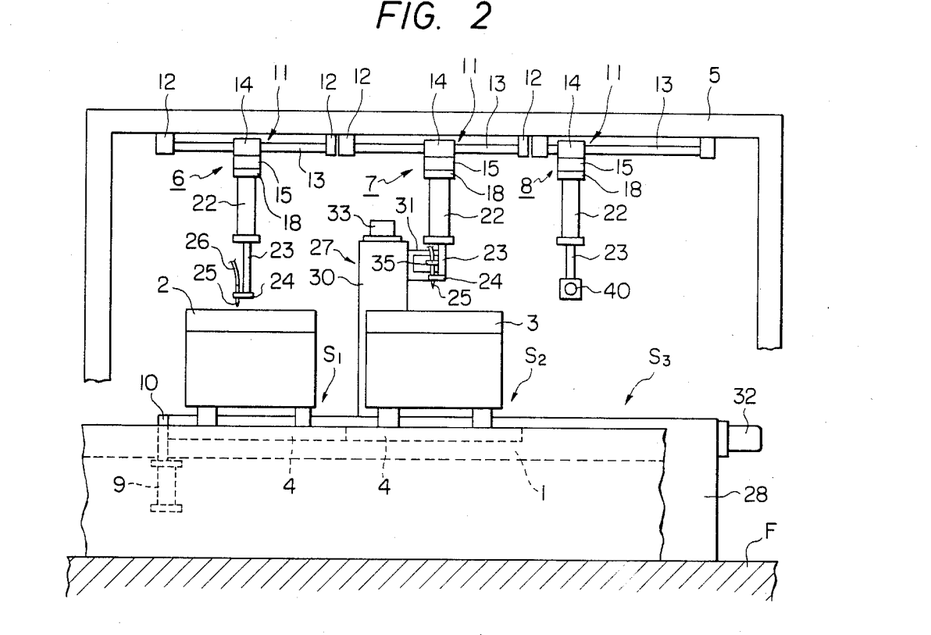
FIG. 2 is a schematic front view showing inclusively the embodiment of FIG. 1.
Figure 3:
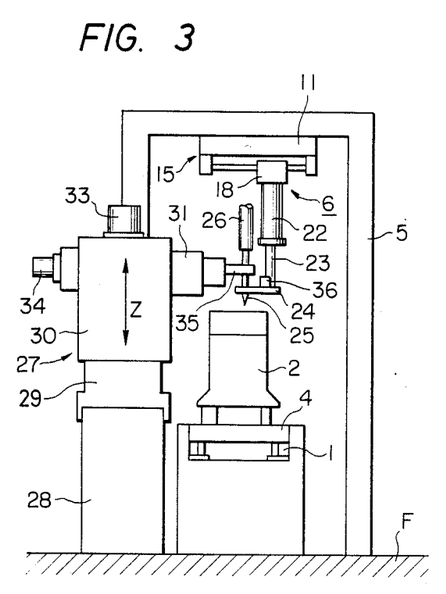
FIG. 3 is a schematic side view showing the embodiment of FIG. 1.

FIGS. 1 to 3 show one example of the working arrangement according to the present invention. This example is constituted to be operative to charge each of incomplete gasoline engines of a plurality of different types and incomplete Diesel engines of a plurality of different types, which are supplied as unfinished works, with engine oil through an oil filler provided thereon with a corresponding nozzle which serves as a tool.

Referring to FIGS. 1 to 3, a work conveyer 1 such as a roller conveyer, which flows to transport intermittently incomplete gasoline engines 2 and incomplete Diesel engines 3 in the direction from right to left, is installed on a floor F. The incomplete gasoline engines 2 and the incomplete Diesel engines 3 are placed on respective supporting plates 4 carried by the work conveyer 1 at almost regularly spaced intervals, so that, for example, each incomplete Diesel engine 3 is transported after five incomplete gasoline engines 2 have been transported successively in consideration of the time lapsed during the preceding process for each of the incomplete gasoline engines 2 and the incomplete Diesel engines 3 and the number of production of each of complete gasoline engines and complete Diesel engines.

In association with the work conveyer 1, a working station $S_1$ where each incomplete gasoline engine 2 is charged with engine oil and a working station $S_2$ where each incomplete Diesel engine 3 is charged with engine oil are provided in series so that the working station $S_2$ is positioned above the working station $S_1$ along the flow of the work conveyer 1. Further, a working station $S_3$ where each incomplete gasoline engine 2 and each incomplete Diesel engine 3 are discriminated from each other is provided above the working station $S_2$ along the flow of the work conveyer 1. Over the work conveyer 1, a frame structure 5 is provided to support shifting units 6, 7 and 8 above the working stations $S_1$, $S_2$ and $S_3$, respectively. The shifting unit 8 has a work discriminating sensor 40.

With such an arangement, in the case where the incomplete gasoline engine 2 is detected by the work discriminating sensor 40 at the working station $S_3$, a stopper 10 which is moved up and down by a cylinder device 9, as shown in FIG. 2, is projected on the work conveyer 1 to engage with the front end of the supporting plate 4 on which the incomplete gasoline engine 2 is placed and thereby cause the incomplete gasoline engine 2 to cease moving at the working station $S_1$ when the incomplete gasoline engine 2 detected at the working station $S_3$ is conveyed into the working station $S_1$. On the other hand, in the case where the incomplete Diesel engine 3 is detected by the work discriminating sensor 40 at the working station $S_3$, a stopper (not shown in the drawings) which is also moved up and down in the same manner as the stopper 10 provided in connection with the working station $S_1$ is projected on the work conveyer 1 to engage with the front end of the supporting plate 4 on which the incomplete Diesel engine 3 is placed and thereby cause the incomplete Diesel engine 3 to cease moving at the working station $S_2$ when the incomplete Diesel engine 3 detected at the working station $S_3$ is conveyed into the working station $S_2$. Incidentally, a further stopper which is also moved up and down in the same manner as the stopper 10 provided in connection with the working station $S_1$ is provided in connection with the working station $S_3$ so as to cause the incomplete gasoline engine 2 or the incomplete Diesel engine 3 to stay temporarily at the working station $S_3$.

Figure 4:
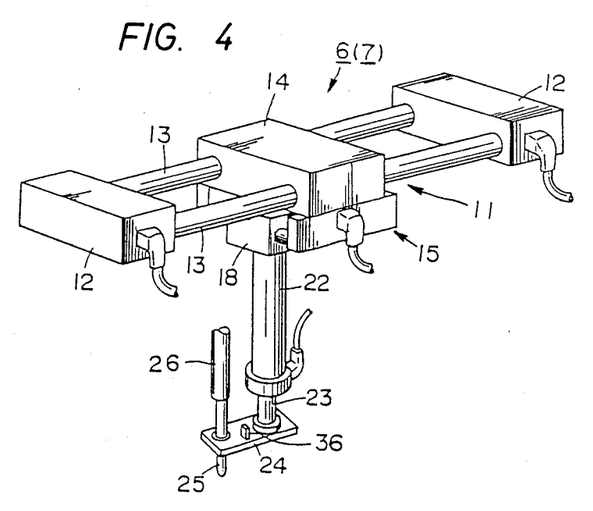
FIG. 4 is a perspective view showing a shifting unit employed in the embodiment of FIG. 1.

Next, the shifting units 6 and 7 will be described in detail with reference to FIGS. 4 and 5 in addition to FIGS. 1 to 3.

Each of the shifting units 6 and 7 has a first cylinder driving device 11 attached to the frame structure 5 above the working station $S_1$ or $S_2$. As shown in FIG. 4, the first cylinder driving device 11 comprises a pair of right and left air cylinders 12 fixed to the frame structure 5, a pair of pipe-shaped guide members 13 provided in parallel with each other between the right and left air cylinders 12, and a moving block member 14 supported to be slidable by the pipe-shaped guide members 13. Each of the pipe-shaped guide members 13 contains therein a movable magnet (not shown in the drawings) serving as a free piston in the pipe-shaped guide member 13 and the moving block member 14 has a fixed magnet (not shown in the drawings) which is polarized to attract the movable magnet contained in each of the pipe-shaped guide members 13. Accordingly, when the air cylinder 12 positioned on the right in FIG. 5 is charged with air and simultaneously air is discharged from the air cylinder 12 positioned on the left in FIG. 5, the movable magnets contained in the pipe-shaped guide members 13 are moved by the air pressure toward the air cylinder 12 positioned on the left in FIG. 5 and consequently the moving block member 14 is also moved toward the air cylinder 12 positioned on the left in FIG. 5 together with the movable magnets contained in the pipe-shaped guide members 13. Further, when the right and left air cylinders 12 are closed, the moving block member 14 is locked up, and when the right and left air cylinders 12 are released to the atmosphere, the moving block member 14 can be moved freely along the pipe-shaped guide members 13 by external force applied thereto.

A second cylinder driving device 15 is attached to the under surface of the moving block member 14. As shown in FIG. 5, the second cylinder driving device 15 comprises a pair of air cylinders 16 fixed to the moving block member 14, a pair of pipe-shaped guide members 17 provided in parallel with each other between the air cylinders 12, and a moving block member 18 supported to be slidable by the pipe-shaped guide members 17, in a similar manner as the first cylinder driving device 11, so that the moving block member 18 is locked up when the air cylinders 16 are simultaneously closed and can be moved freely along the pipe-shaped guide members 17 when the air cylinders 16 are simultaneously released to the atmosphere.

Figure 5:
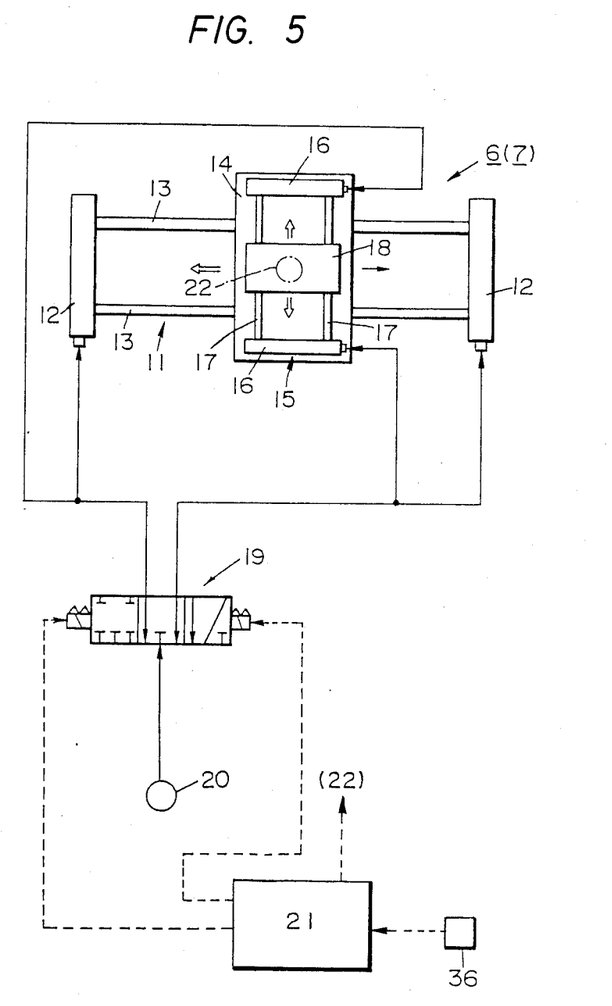
FIG. 5 is a schematic view showing the configuration of a control system for the shifting unit shown in FIG. 4.

An example of an air supply controlling circuit for supplying with air to the air cylinders 12 and 16 is constituted as shown in FIG. 5. This air supply controlling circuit shown in FIG. 5 includes an electromagnetic changeover valve 19 of the five port-three position type provided for the first and second cylinder driving devices 11 and 15, an air source 20 such as an air tank connected to the electromagnetic changeover valve 19, and a control circuit block 21 for controlling the electromagnetic changeover valve 19.

Figure 6:
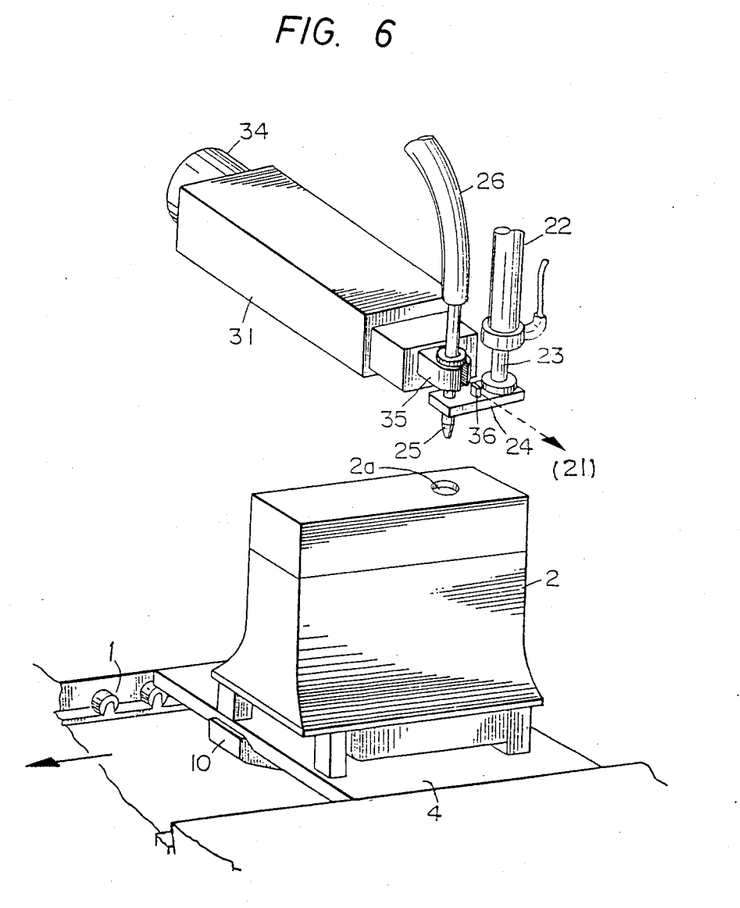
FIG. 6 is a perspective view showing a part of a robot employed in the embodiment of FIG. 1, a tool gripped by the robot and an unfinished work positioned under the tool.

The upper end of an air cylinder 22 elongating up and down with a piston rod 23 is fixed to the under surface of the moving block member 18 in the second cylinder driving device 15, and as apparently shown in FIG. 6, a bracket 24 is attached to the end of the piston rod 23. A nozzle 25 is fixed to the bracket 24 so as to pass through the bracket 24. The lower end portion of the nozzle 25 projecting downward from the bracket 24 is inserted into an oil filler 2a provided on the incomplete gasoline engine 2 or an oil filler 3a provided on the incomplete Diesel engine 3, and the intermediate portion of the nozzle 25 positioned on the bracket 24 is gripped by a robot 27 as described in detail later. Further, the upper end portion of the nozzle 25 is connected to an oil supplying pipe 26 through which engine oil for gasoline engines or Diesel engines is supplied to the nozzle 25. The air cylinder 22 is supplied with air through an additional electromagnetic changeover valve (not shown in the drawings) which is controlled also by the control circuit block 21.

In each of the first and second cylinder driving devices 11 and 15, the moving block member 14 is located at one end of the moving area thereof when one of the air cylinders 12 is charged with air and the moving block member 18 is located at one end of the moving area thereof when one of the air cylinders 16 is charged with air. The nozzle 25 is at a reference position when the piston rod 23 is drawn in the air cylinder 22 and is at an operating position when the piston rod 23 is extended to cause the lower end portion of the nozzle 25 to be inserted into the oil filler 2a of the incomplete gasoline engine 2 or the oil filler 3a of the incomplete Diesel engine 3.

The shifting unit 8 provided above the working station $S_3$ for discriminating the sort of engine is constructed basically in the same manner as the shifting units 6 and 7, and as shown in FIG. 2, the work discriminating sensor 40 is attached to the lower end portion of a piston rod 23 provided in the shifting unit 8. A series of operation steps for moving the work discriminating sensor 40 in a predetermined order to detect characterizing portions of each of the incomplete gasoline engines 2 and the incomplete Diesel engines 3 is memorized in the robot 27.

Then, the robot 27 will be described with reference to FIGS. 1 to 4 and 6 hereinafter.

In the vicinity of the work conveyer 1, a guide base 28 is installed on the floor F so as to elongate along the alignment of the working stations $S_1$, $S_2$ and $S_3$, and the robot 27 is set on the guide base 28. The robot 27 is formed into a robot of the Cartesian coordinate type which is operative to move in the directions indicated respectively by X, Y and Z in FIGS. 1 and 3 (the X, Y and Z directions) which are perpendicular to one another, and comprises a first movable member 29 which is able to slide in the X direction on the guide base 28, a second movable member 30 which is able to go up and down in the Z direction in relation to the first movable member 29, and an arm member 31 which is able to move in the Y direction in relation to the second movable member 30. The first movable member 29 is driven to move in the X direction by a motor 32 attached to the guide base 28 (FIGS. 1 and 2), the second movable member 30 is driven to move in the Z direction by a motor 33 provided thereon (FIGS. 1 to 3), and the arm member 31 is driven to move in the Y direction by a motor 34 attached thereto (FIGS. 1, 3 and 6).

A hand member 35 comprising a chuck which is capable of opening and closing is provided at the end portion of the arm member 31, and the opening and closing movement of the hand member 35 is controlled by an actuator (not shown in the drawings) mounted in the arm member 31. The hand member 35 is operative to grip the intermediate portion of the nozzle 25 aforementioned and the work discriminating sensor 40, and a noncontact sensor 36 for detecting a condition in which the nozzle 25 or the work discriminating sensor 40 is gripped by the hand member 35 or a condition in which the nozzle 25 or the work discriminating sensor 40 is released from the hand member 35, is mounted on the braket 24 provided in each of the shifting units 6, 7 and 8 (FIGS. 3, 4 and 6).

Now, the sequential operation of the embodiment of the present invention constituted as described above for charging the incomplete gasoline engine 2 or the incomplete Diesel engine 3 with engine oil will be explained hereinafter.

Prior to the operation of the robot 27, in each of the shifting units 6 and 7, one of the air cylinders 12 is charged with air, so that the moving block member 14 is positioned at the end of the moving area thereof on the left side in FIG. 5, and simultaneously one of the air cylinders 16 is charged with air, so that the moving block member 18 is also positioned at the end of the moving area thereof on the upper side in FIG. 5. Further, the piston rod 23 is drawn in the air cylinder 22, so that the nozzle 25 serving as the tool is at the reference position.

Under such a situation, the robot 27 is caused to operate to hold the work discriminating sensor 40 attached to the shifting unit 8 and move the same in accordance with a series of operation steps in the predetermined order to detect characterizing portions of an incomplete engine which is conveyed into the working station $S_3$, and the incomplete gasoline engine 2 or the incomplete Diesel engine 3 is discriminated on the strength of detection outputs of the work discriminating sensor 40. Then, for example, the incomplete gasoline engine 2 is conveyed into the working station $S_1$ through the work conveyer 1 and caused to stop thereat after being discriminated by the work discriminating sensor 40 at the working station $S_3$, and the robot 27 is controlled to be ready for setting the nozzle 25 supported by the shifting unit 6 to the incomplete gasoline engine 2 at the working station $S_1$.

After that, the operation of the robot 27 and the operation of each of the shifting units 6 and 7 are performed as follows.

First, the robot 27 is moved into a position corresponding to the working station $S_1$ in accordance with the detection outputs of the work discriminating sensor 40 and the hand member 35 of the robot 27 grips the nozzle 25 supported by the shifting unit 6. Hereupon, the noncontact sensor 36 detects that the nozzle 25 supported by the shifting unit 6 is gripped by the hand member 35 of the robot 27 and the detection output of the noncontact sensor 36 is supplied to the control circuit block 21. The control circuit block 21 supplied with this detection output of the noncontact sensor 36 controls the electromagnetic changeover valve 19 to be set as shown in FIG. 5 so that the moving block members 14 and 18 are able to be moved freely along the pipe-shaped guide members 13 and 17, respectively.

Next, the robot 27 shifts the nozzle 25 to a position right above the oil filler 2a of the incomplete gasoline engine 2 and then the hand member 35 of the robot 27 releases the nozzle 25, so that the nozzle 25 is set to the incomplete gasoline engine 2. Hereupon, the noncontact sensor 36 detects that the nozzle 25 is released from the hand member 35 of the robot 27 and the detection output of the noncontact sensor 36 is also supplied to the control circuit block 21. In this case, the control circuit block 21 supplied with the detection output of the noncontact sensor 36 controls the electromagnetic changeover valve 19 to shut the air cylinders 12 and 16 so that the moving block members 14 and 18 are locked up with the nozzle 25 positioned right above the oil filler 2a of the incomplete gasoline engine 2. After that, the piston rod 23 in the air cylinder 22 is extended downward so as to insert the lower end portion of the nozzle 25 into the oil filler 2a of the incomplete gasoline engine 2 and the engine oil for gasoline engines is supplied through the oil supplying pipe 26 and the nozzle 25 to the incomplete gasoline engine 2.

During such operations for charging the incomplete gasoline engine 2 with the engine oil for gasoline engines as mentioned above, the robot 27 is moved into a position corresponding to the working station $S_3$ as soon as the hand member 35 thereof releases the nozzle 25, and holds the work discriminating sensor 40 attached to the shifting unit 8 with the hand member 35 thereof to move the same so as to discriminate an incomplete engine newly conveyed into the working station $S_3$. In the case where the incomplete Diesel engine 3 is detected by the work discriminating sensor 40, the incomplete Diesel engine 3 is conveyed into the working station $S_2$ through the work conveyer 1 and caused to stop thereat. Simultaneously, the hand member 35 of the robot 27 releases the work discriminating sensor 40 and the robot 27 is moved into a position corresponding to the working station $S_2$.

At the working station $S_2$, the hand member 35 of the robot 27 grips the nozzle 25 supported by the shifting unit 7. Then, in the same manner as the operations performed to the incomplete gasoline engine 2 at the working station $S_3$, the robot 27 shifts the nozzle 25 supported by the shifting unit 7 to a position right above the oil filler 3a of the incomplete Diesel engine 3 and the hand member 35 of the robot 27 releases the nozzle 25, so that the nozzle 25 is set to the incomplete Diesel engine 3. After that, the lower portion of the nozzle 25 is inserted into the oil filler 3a of the incomplete Diesel engine 3 and the engine oil for Diesel engines is supplied through the oil supplying pipe 26 and the nozzle 25 to the incomplete Diesel engine 3.

If the incomplete gasoline engine 2 is detected by the work discriminating sensor 40, no engine is conveyed into the working station $S_2$.

When the incomplete gasoline engine 2 at the working station $S_1$ has been charged with a predetermined quantity of engine oil for gasoline engines, the supply of the engine oil through the oil supplying pipe 26 and the nozzle 25 to the incomplete gasoline engine 2 is stopped, and the shifting unit 6 operates to cause the piston rod 23 to be drawn in the air cylinder 22 so that the nozzle 25 is pulled out of the oil filler 2a of the incomplete gasoline engine 2 and further to cause the moving block member 14 to return to the reference position.

Similarly, when the incomplete Diesel engine 3 at the working station $S_2$ has been charged with a predetermined quantity of engine oil for Diesel engines, the supply of the engine oil through the oil supplying pipe 26 and the nozzle 25 to the incomplete Diesel engine 3 is stopped, and the shifting unit 7 operates to cause the piston rod 23 to be drawn in the air cylinder 22 so that the nozzle 25 is pulled out of the oil filler 3a of the incomplete Diesel engine 3 and further to cause the moving block member 18 to return to the reference position.

As described above, one working cycle for engine oil supply is completed and such a working cycle is repeatedly continued. In the case where the incomplete gasoline engines 2 are conveyed successively into the working station $S_1$, the robot 27 does not perform any operations at the working station $S_2$.

Figure 7:
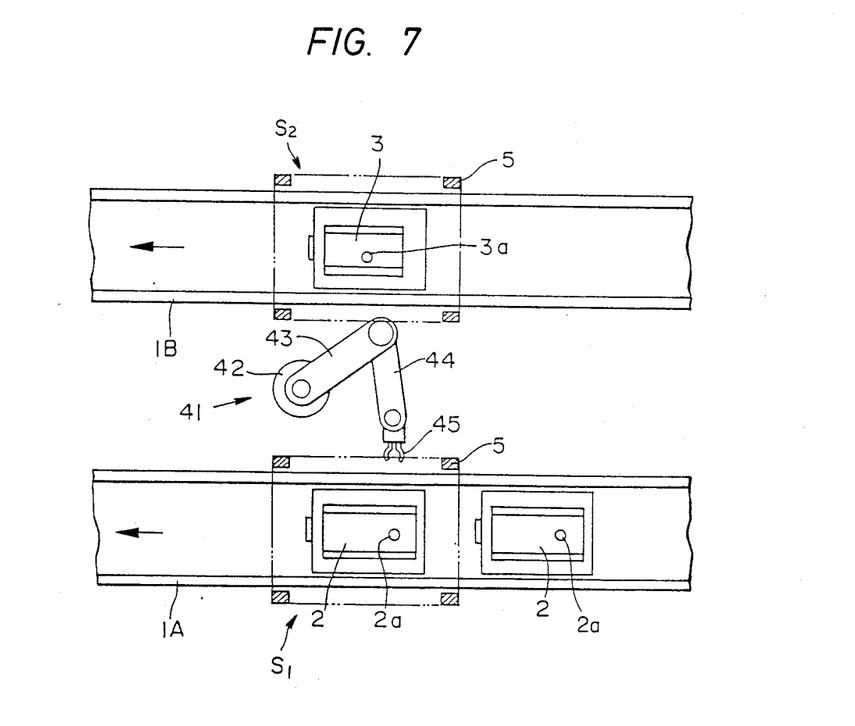
FIG. 7 is a schematic plane view showing partially another embodiment of working arrangement for performing multiple operations with a robot according to the present invention.

FIG. 7 shows another example of the working arrangement according to the present invention. In FIG. 7, devices and parts corresponding to those of FIGS. 1 to 3 are marked with the same references and further description thereof will be omitted.

In the example shown in FIG. 7, a work conveyer 1A for transporting the incomplete gasoline engines 2 and a work conveyer 1B for transporting the incomplete Diesel engines 3 are independently installed in parallel with each other. The working stations $S_1$ and $S_2$ are provided in relation to the work conveyers 1A and 1B, respectively, and a robot 41 is installed between the working stations $S_1$ and $S_2$.

The robot 41 is formed into a robot of the articulated type and comprises a base 42, a first arm member 43 mounted on the base to be able to go up and down in relation thereto and to be rotatable, a second arm member 44 connected to be rotatable with the end of the first arm member 43, and a hand member 45 coupled with the end of the second arm member 44. The movement of the robot 41 from the working station $S_1$ to the working station $S_2$ and vice versa is achieved through rotations of the first and second arm members 43 and 44.

In this example also, the shifting units 6 and 7 are provided above the working stations $S_1$ and $S_2$, respectively, though illustrations thereof are omitted. Further, at the upper course of each of the work conveyers 1A and 1B, a work discriminating device (not shown in the drawings) is provided for discriminating the incomplete gasoline engine 2 and the incomplete Diesel engine 3 from each other, and in response to the detection output of the work discriminating device, the incomplete gasoline engines 2 and the incomplete Diesel engines 3 are charged with engine oil successively in the order of arrival at the working station $S_1$ or $S_2$ through the nozzle 25 fixed to the shifting unit 6 or 7 and gripped by the hand member 45 of the robot 41. Other operations are carried out in almost the same manner as the corresponding operations performed in the aforementioned embodiment shown in FIGS. 1 to 3.

Figure 8:
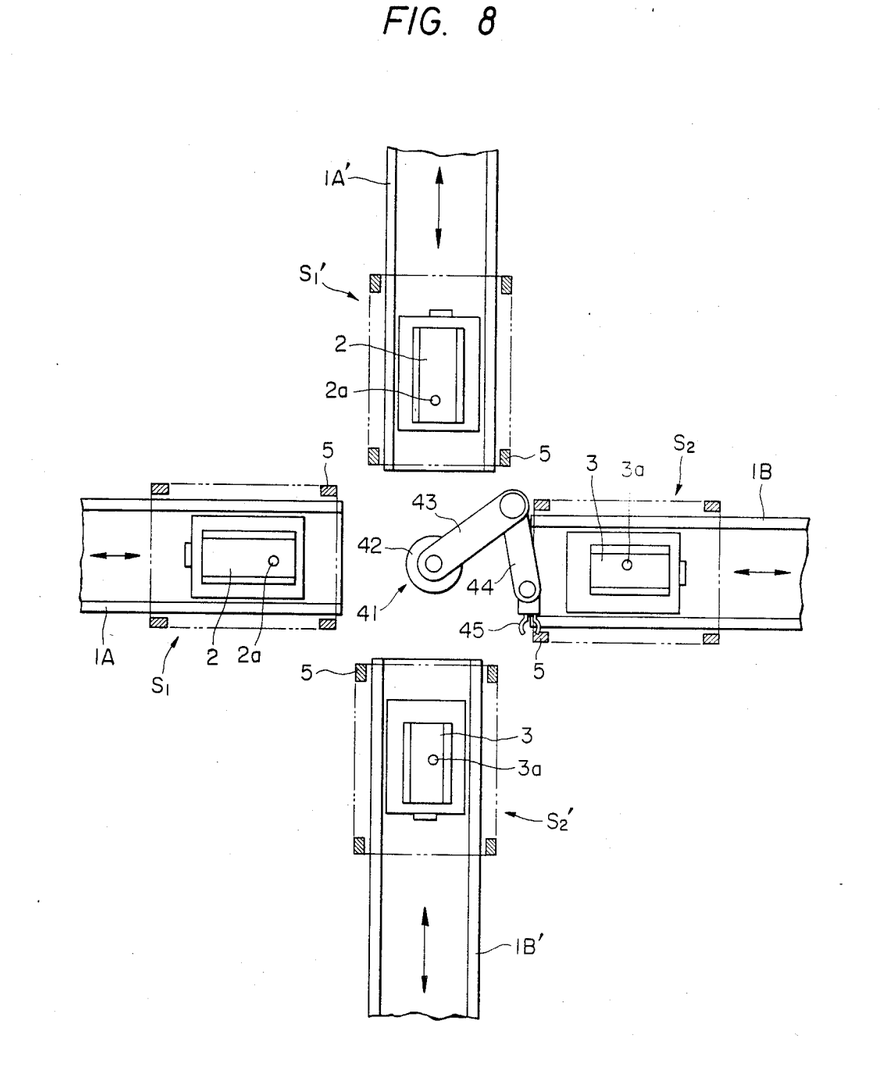
FIG. 8 is a schematic plane view showing partially a further embodiment of working arrangement for performing multiple operations with a robot according to the present invention.

FIG. 8 shows a further example of the working arrangement according to the present invention. In FIG. 8, devices and parts corresponding to those of FIG. 7 are marked with the same references and further description thereof will be omitted.

In the embodiment shown in FIG. 8, the work conveyers 1A and 1B are aligned in series with the respective end portions facing each other, and each of the work conveyers 1A and 1B is driven to transport the incomplete gasoline engines 2 or the incomplete Diesel engines 3 in two directions opposite to each other, as indicated with an arrow filled therein. The working stations $S_1$ and $S_2$ are provided in relation to the end portions of the work conveyers 1A and 1B facing each other, respectively, and the robot 41 is positioned between these mutually facing end portions of the work conveyors 1A and 1B.

In addition to the work conveyors 1A and 1B, another couple of work conveyors 1A' and 1B' for transporting the incomplete gasoline engines 2 and the incomplete Diesel engines 3, respectively, are installed with the respective end portions facing each other, so as to extending in the direction perpendicular to the direction along which the work conveyors 1A and 1B are aligned. Each of the work conveyors 1A' and 1B' is also driven to transport the incomplete gasoline engines 2 or the incomplete Diesel engines 3 in two directions opposite to each other, as indicated with an arrow filled therein.

Further, additional working stations $S_1'$ and $S_2'$ are provided in relation to the end portions of the work conveyors 1A' and 1B' facing each other, respectively, so that the robot 41 is positioned between the working stations $S_1'$ and $S_2'$. The movement the robot 41 from the working station $S_1$ to the working station $S_2$ and vice versa is achieved through rotations of the first and second arm members 43 and 44 in the same manner as the embodiment shown in FIG. 7, and further the movement of the robot 41 from the working station $S_1'$ to the working station $S_2'$ and vice versa is also achieved through rotations of the first and second arm members 43 and 44.

In this embodiment, a pair of shifting units 6 are provided above the working stations $S_1$ and $S_1'$, respectively, and a pair of shifting units 7 are provided above the working stations $S_2$ and $S_2'$, respectively, though illustrations thereof are omitted. Further, one or more work discriminating devices (not shown in the drawings) are provided in relation to the work conveyors 1A, 1B, 1A' and 1B' for discriminating the incomplete gasoline engine 2 and the incomplete Diesel engine 3 from each other, and in response to the detection output of each work discrimnating device, the incomplete gasoline engines 2 and the incomplete Diesel engines 3 are charged with engine oil successively in the order of arrival at the working station $S_1$, $S_2$, $S_1'$ or $S_2'$ through the nozzle 25 fixed to one of the shifting units 6 or 7 and gripped by the hand member 45 of the robot 41. Other operations are performed in almost the same manner as the corresponding operations carried out in the embodiment shown in FIG. 7.

Although several illustrative embodiments of the present invention have been described herein with reference to the accompanying drawings, it is to be understood that the invention is not limited thereto, and that various changes and modifications may be effected therein without departing from the scope of the present invention as defined in the appended claims. For example, the operations performed at the working stations $S_1$ and $S_2$ can be selected to be some work other than the operations for charging the incomplete engines with engine oil, for example, work for coupling plural members with each other by screws, work for mechanically processing unfinished products and so on. Furthermore, it is possible to have a modification in which the robot 27 or 41 operates selectively at more than three working stations, and it is also possible to modify each of the shifting units 6, 7 and 8 so as to be driven by a motor.

What is claimed is:

1. A working arrangement for performing multiple operations with a robot comprising:
    a plurality of working stations at each of which a predetermined operation with a tool is performed on an unfinished work,
    shifting means provided in connection with each of said working stations for holding the tool so as to be movable between a predetermined reference position and an operating position in each working station, for causing the tool to act on the work at said operating position after the tool has been shifted thereinto, and for shifting the tool to said predetermined reference position from said operating position, and
    a single robot provided to be movable in relation to said plurality of working stations for causing the tool to move from said predetermined reference position to said operating position in each of said plurality of working stations.

2. A working arrangement according to claim 1, wherein said working stations are positioned in series and said single robot comprises at least one movable member operative to move along the alignment of said working stations.

3. A working arrangement according to claim 2 further comprising work conveying means extending along the alignment of said working stations for transporting the unfinished work to each of said working stations.

4. A working arrangement according to claim 1, wherein said working stations are positioned to face each other with said single robot therebetween and said single robot comprises at least one rotatable member for rotating to move between said working stations.

5. A working arrangement according to claim 4 further comprising a plurality of work conveying means extending in parallel with each other for transporting the unfinished works to said working stations.

6. A working arrangement according to claim 5, wherein each of said work conveyers is installed to pass through at least one of said working stations.

7. A working arrangement according to claim 1, wherein said working stations are positioned around said single robot and said single robot comprises at least one rotatable member for rotating to move from one of said working stations to another of said working stations.

8. A working arrangement according to claim 7 further comprising a first pair of work conveying means aligned in series with respective end portions facing each other for transporting the unfinished works to a pair of said working stations positioned to face each other with said robot therebetween, and a second pair of work conveying means aligned in series with respective end portions facing each other for transporting the unfinished works to another pair of said working stations positioned to face each other with said single robot therebetween, said second pair of work conveying means extending in the direction perpendicular to the direction along which said first pair of work conveyers are aligned.

9. A working arrangement according to claim 8, wherein said first pair of work conveyers are installed to pass through said pair of said working stations, respectively, and said second pair of work conveyers are installed to pass through said another pair of said working stations, respectively.

10. A working arrangement according to claim 1, wherein said shifting means is operative to move in three directions perpendicular to one another in relation to each of said working stations.

11. A working arrangement according to claim 10, wherein said shifting means is positioned above each of said working stations.

* * * * *